(12) United States Patent
Hwang

(10) Patent No.: US 6,188,941 B1
(45) Date of Patent: Feb. 13, 2001

(54) PROGRAMMABLE IGNITION-CONTROLLED DOOR LOCK

(76) Inventor: Shih-Ming Hwang, 17811 Sky Park Cir. Suite D & E, Irvine, CA (US) 92614

( * ) Notice: Under 35 U.S.C. 154(b), the term of this patent shall be extended for 0 days.

(21) Appl. No.: 09/054,435

(22) Filed: Apr. 3, 1998

(51) Int. Cl.[7] .................................................. B60R 15/00
(52) U.S. Cl. .............................. 701/49; 701/35; 307/10.6
(58) Field of Search .................................. 701/29, 30, 45, 701/35, 49; 340/438; 307/10.1, 10.3, 10.6

(56) References Cited

U.S. PATENT DOCUMENTS

| | | | |
|---|---|---|---|
| 4,709,776 | * 12/1987 | Metz | 180/281 |
| 4,834,207 | * 5/1989 | Havenhill et al. | 180/287 |
| 4,892,014 | * 1/1990 | Morell et al. | 74/866 |
| 5,111,902 | * 5/1992 | Sundeen et al. | 307/10.1 |
| 5,485,376 | * 1/1996 | Oike et al. | 701/35 |
| 5,777,546 | * 7/1998 | Dean et al. | 340/438 |

* cited by examiner

*Primary Examiner*—Tan Nguyen
(74) *Attorney, Agent, or Firm*—Bacon & Thomas, PLLC

(57) ABSTRACT

An automatic door lock for a vehicle is arranged to lock the door of the vehicle following starting of the vehicle and performance by the driver of another action, such as stepping on the brake pedal of the vehicle in preparation for placement of the vehicle in gear, thereby ensuring that automatic door locking will occur even after the driver exits and re-enters the vehicle after starting it to permit the vehicle to warm up before driving away. The controller may also be programmed to lock the vehicle doors immediately following turning of the ignition, in situations where the brake pedal would not necessarily be pressed prior to placing the vehicle in gear, such as in the case of a manual transmission.

12 Claims, 2 Drawing Sheets

PROGRAMMABLE IGNITION-CONTROLLED DOOR LOCK

BACKGROUND OF THE INVENTION

1. Field of the Invention

The present invention relates to an apparatus and method for locking the door of a vehicle, and in particular to an apparatus and method for locking a vehicle door automatically in response to starting of the vehicle and the occurrence of an additional event, such as the pressing of the brake pedal prior to placing the vehicle in gear.

2. Description of Related Art

Nearly every vehicle alarm system has an ignition controlled door lock/unlock feature that locks the doors automatically when the ignition is turned on. Automatic locking ensures that no one can open a door of the vehicle while it is moving, or enter the vehicle while it is temporarily stopped, relieving the driver of the responsibility for carrying out this safety function.

In situations where a driver might wish to start the engine and sweep snow or scrape ice of the car while the engine is warming up, however, automatic locking of the vehicle doors following starting of the engine is an inconvenience. Although the driver can exit the vehicle after door locking has taken place, if the driver later re-enters the vehicle and drives away without re-starting the engine, the doors will not be automatically locked. As a result, it would be desirable for the automatic door locking feature to take effect only after some further action is performed, and in particular some further action that is normally performed after starting of the vehicle, but not until just before the vehicle is to be driven and the driver no longer has any need to exit the vehicle.

One suitable action that may be used to trigger the automatic door locking feature, in the case of automatic transmission vehicles, is stepping on the brake of the vehicle. In such vehicles, the driver will generally step on the brake before putting the vehicle in gear, making pressing the brake an appropriate trigger for the automatic locking function.

In manual transmission vehicles, on the other hand, the driver will not generally step on the brake before moving the vehicle, in which case it should be possible to leave the door locking function dependent on ignition or starting of the vehicle rather than pressing of the brake, or to make the door locking function dependent on some action or event other than pressing of the vehicle brake, such as release of a parking brake, placing the vehicle in gear, or release of a clutch pedal while the vehicle is in gear.

SUMMARY OF THE INVENTION

It is a accordingly a first objective of the invention to provide an apparatus and method for locking the door or doors of a vehicle following starting of the vehicle and performance by the driver of another action, the other action indicating that the driver is ready to move the vehicle and no longer would need to exit, thereby allowing the driver to start and leave the vehicle as it warms up, while ensuring that automatic door locking occurs before the vehicle is driven away.

It is a second objective of the invention to provide an apparatus and method which enables the feature of automatic locking of the vehicle following starting and the occurrence of an additional event to be programmed, so that the system can also be enabled, if desired, to automatically lock the vehicle immediately upon starting of the vehicle, as opposed to locking of the vehicle only upon occurrence of starting followed by the additional event.

These objectives are achieved, in accordance with the principles of the invention, by providing an automatic door locking feature that locks the doors of the vehicle upon detection of two separate user inputs. The two inputs may include, but are not limited to, the turning of a key in the ignition to start the engine of the vehicle, and depression by the driver of the brake pedal of the vehicle.

In an especially preferred embodiment of the invention, the automatic door locking feature is provided as part of a programmable vehicle security system. Such programmable vehicle security systems typically include a microprocessor-based controller having multiple inputs and outputs, the response of the outputs to the inputs being programmable either by the installer or the user. In the preferred embodiment of the invention, an output to the door locking mechanism is programmable to be controlled either by detection that the ignition switch has been turned to the ON position, or upon detection that the ignition switch has been turned to the ON position and that the brake pedal has been pressed.

A suitable system to which the principles of the invention may be applied is the one disclosed in U.S. patent application Ser. No. 09/002,408, filed Jan. 2, 1998, herein incorporated by reference, which is user-programmable by means of a remote control transmitter or other readily accessible user inputs, and readily adaptable to include additional programmable functions. However, the principles of the invention may also be applied to other vehicle security or convenience systems, including systems that are programmable only during installation, or which are not programmable at all.

Although the automatic door locking apparatus and method of the invention utilizes two user inputs or events, those skilled in the art will appreciate that the concept could be extended to make door locking dependent on more than two inputs, or to enable programmable selection of alternative or additional inputs. In the case of a manual transmission vehicle, for example, it may be desirable to make door locking dependent on release of the parking brake, since in the situation discussed above, in which the driver desires to warm up the vehicle after starting and leaving the vehicle, the driver will typically leave the parking brake on while the car is idling in neutral, and release the brake only after re-entering the vehicle in preparation for driving away.

Consequently, while the preferred system only offers the options of automatic locking following ignition and automatic locking following ignition and depression of the brake pedal, in order to provide optimal convenience for most users without unduly raising the cost of the system in which the feature is included, those skilled in the art will appreciate that the invention is not intended to be limited to the specific user inputs disclosed below.

DETAILED DESCRIPTION OF THE PREFERRED EMBODIMENTS

Figure 1:
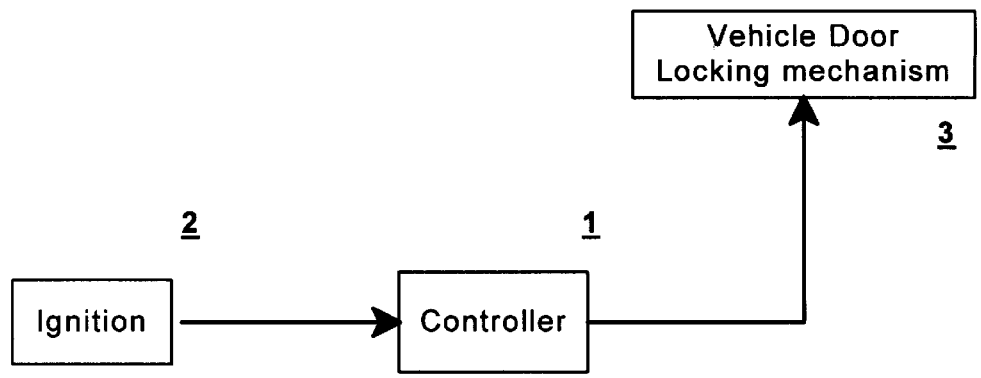
FIG. 1 is a functional block diagram of a conventional automatic door locking mechanism.

FIG. 1 is a functional block diagram of a conventional automatic door locking system, including a central controller 1, which may be the central controller of a vehicle security system, a controller of a vehicle convenience system with no security functions, or a dedicated door locking controller.

The central controller 1 is connected to a sensor 2 placed adjacent to the ignition cylinder to detect turning of the cylinder to the start or ignition position, and to an electrical door locking mechanism 3. Upon detection that the vehicle has been started, the controller outputs a locking signal to the door locking mechanism 3 which causes the doors of the vehicle to lock.

Although conveniently placed adjacent the ignition cylinder, sensor 2 could take a variety of forms, so long as it indicates starting of the motor or placement of the key in the ignition. Most vehicle security systems already include sensors arranged to detect starting of the vehicle, and are connected to the door locking mechanism to control door locking and unlocking, so the feature can be included with no additional wiring.

Figure 2:
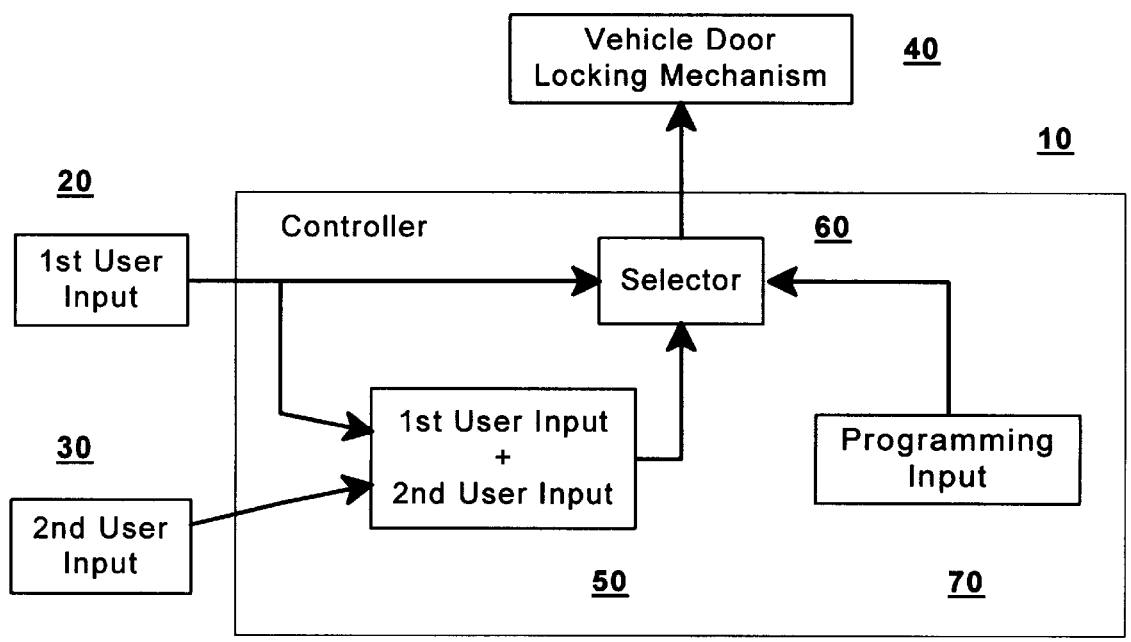
FIG. 2 is a functional block diagram of an automatic door locking apparatus arranged in accordance with the principles of a preferred embodiment of the invention.

The system shown in FIG. 2 uses the same basic wiring as shown in FIG. 1, including connections between controller 10 and user inputs 20 and 30, one of which may be an ignition sensor similar to or identical to sensor 2 shown in FIG. 1, and the other of which may be a sensor responsive to the position of the brake pedal. Controller 10 is also connected to the vehicle door lock mechanism 40, which may be identical to the vehicle door lock mechanism 3 shown in FIG. 1.

In this embodiment, the central controller 10 is arranged to provide the option of locking the doors only when detection of user input 20 is followed by detection of user input 30. This function is indicated by block 50, although it will be appreciated by those skilled in the art that block 50 will generally be implemented in the form of software or firmware as part of the overall control program for the controller, particularly if the controller is a microprocessor, rather than as a discrete hardware block within the controller.

Functional block 60 represents a toggle function or programmable switch that enables the controller to be programmed to bypass functional block 50 and instead cause automatic door locking directly in response to detection of the ignition, in which case the system would function in the same manner as the system shown in FIG. 1. The means by which the system is programmed is indicated by a block 70 labelled "programming input," and may take the form of a user-activated programming input of the type disclosed in U.S. patent application Ser. No. 09/002,408, or any other programming input, including user-activatable coded programming inputs, dip switches, or even jumpers and other programming means normally programmable only by an installer of the system.

Figure 3:
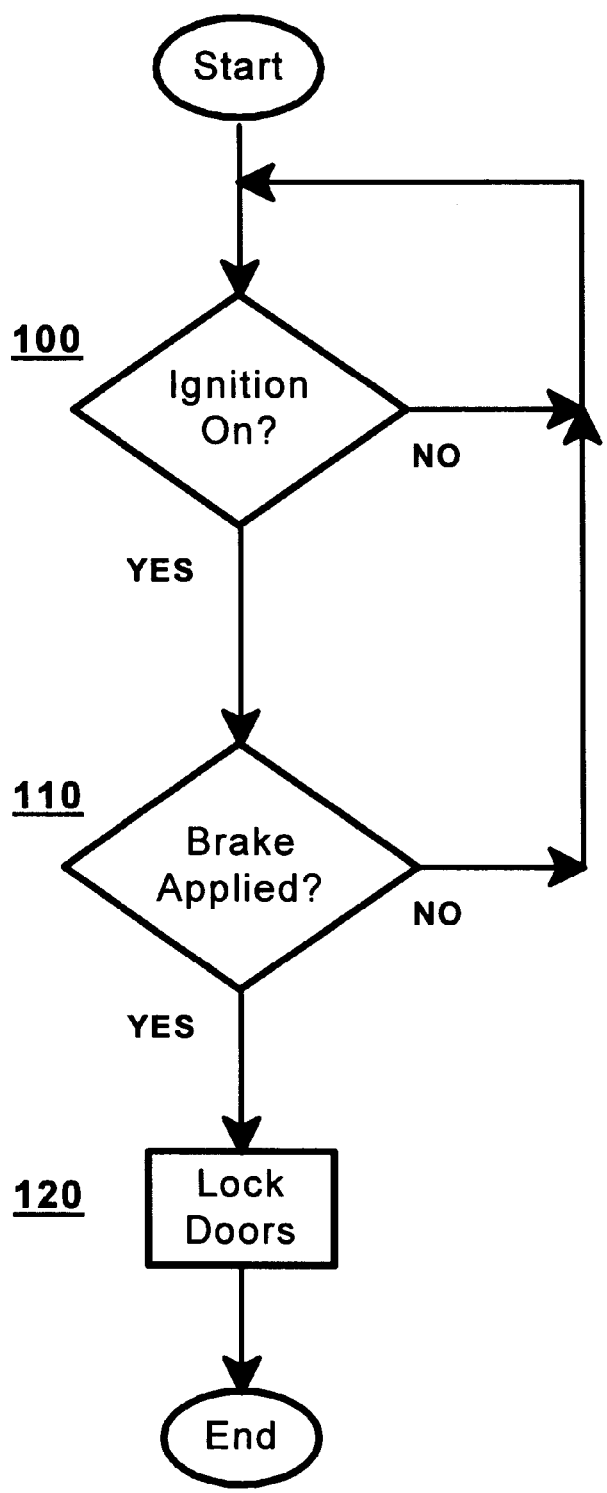
FIG. 3 is a flowchart of an automatic door locking method in accordance with the principles of the preferred embodiment of the invention.

In the case where the first user input is provided by an ignition sensor, and the second user input by a brake pedal position sensor, the control sub-routine by which the controller implements the automatic door locking feature would include the steps illustrated in FIG. 3. For other implementations, those skilled in the art will understand that "2nd user input" or the like may be substituted for the specific step of detecting the brake pedal movement, and that other modifications may be made to the illustrated method in accordance with the modification discussed above in connection with the preferred apparatus.

The first step 100 of the illustrated method is to wait for detection of an indication that the ignition has been turned on. The controller takes no action at this time, but rather waits for detection that the brake pedal has been pressed (step 110). After pressing of the brake pedal has been detected, the system locks the doors of the vehicle (step 120). As a result, the driver of a vehicle equipped with a system constructed according to the principles of the invention may leave the vehicle following starting, in order for example to scrape ice off the windshield while the vehicle is warming up, and then have the doors lock automatically when the vehicle is driven away.

Having thus described a preferred embodiment of the invention in sufficient detail to enable those skilled in the art to make and use the invention, it will nevertheless be appreciated that numerous variations and modifications of the illustrated embodiment may be made without departing from the spirit and scope of the invention, and that the invention is intended to include all such variations and modifications.

For example, as indicated above, while the user input of the preferred embodiment is preferably a brake pedal position sensor, it may be desirable to replace the brake pedal sensor by a different type of sensor, or to add an additional selectable sensor to the brake pedal sensor, in order to better accommodate manual transmission vehicles. As a result, it is intended that the invention not be limited by the above description or accompanying drawings, but that it be defined solely in accordance with the appended claims.

I claim:

1. Apparatus for automatically locking a vehicle door, comprising:
   a door locking mechanism; and
   a controller including first detection means for detecting a first user input and second detection means for detecting a second user input;
   wherein said controller is arranged to cause said door locking mechanism to lock the vehicle door whenever detection of said first user input is followed by detection of said second user input.

2. Apparatus as claimed in claim 1, wherein said first detection means detects turning of a key in the vehicle ignition.

3. Apparatus as claimed in claim 2, wherein said second detection means detects pressing of a brake pedal.

4. Apparatus as claimed in claim 3, further comprising means for programming said controller to either lock said vehicle door automatically in response to turning of the key in the ignition, or in response to turning of the key in the ignition followed by pressing of the brake pedal.

5. Apparatus as claimed in claim 2, further comprising means for programming said controller to either lock said vehicle door automatically in response to turning of the key in the ignition, or in response to turning of the key in the ignition followed by detection of the second user input.

6. Apparatus as claimed in claim 1, further comprising means for programming said controller to either lock said vehicle door automatically in response to detection of the first user input, or in response to detection of the first user input followed by detection of the second user input.

7. A method of automatically locking a vehicle door, comprising the steps of:
   detecting a first user input to a controller;
   detecting a second user input to the controller; and
   causing a door locking mechanism to lock the vehicle door whenever detection of said first user input is followed by detection of said second user input.

8. A method as claimed in claim 7, wherein said step of detecting the first user input comprises the step of detecting turning of a key in an ignition of the vehicle.

9. Apparatus as claimed in claim 8, wherein said step of detecting the second user input comprises the step of detecting pressing of a brake pedal.

10. Apparatus as claimed in claim 9, further comprising the step of programming said controller to either lock said vehicle door automatically in response to turning of the key in the ignition, or in response to turning of the key in the ignition followed by pressing of the brake pedal.

11. Apparatus as claimed in claim 8, further comprising the step of programming said controller to either lock said vehicle door automatically in response to turning of the key in the ignition, or in response to turning of the key in the ignition followed by detection of the second user input.

12. Apparatus as claimed in claim 7, further comprising the step of programming said controller to either lock said vehicle door automatically in response to detection of said first user input, or in response to detection of said first user input followed by detection of said second user input.

\* \* \* \* \*